United States Patent
Thompson

(10) Patent No.: US 6,448,899 B1
(45) Date of Patent: Sep. 10, 2002

(54) POWER INDICATING ETHERNET OUTLET AND METHOD THEREFOR

(75) Inventor: Geoffrey O Thompson, Mountain View, CA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/696,279

(22) Filed: Oct. 25, 2000

(51) Int. Cl.$^7$ ................................................. G08B 5/00
(52) U.S. Cl. .................... 340/815.4; 340/635; 340/657; 340/310.01; 340/310.02; 439/654; 439/131; 439/142; 439/719
(58) Field of Search .............................. 340/815.4, 635, 340/644, 657, 660, 664, 310.01, 310.02, 825.72; 439/654, 131, 142, 719, 491, 490

(56) References Cited

U.S. PATENT DOCUMENTS

| | | | |
|---|---|---|---|
| 5,081,627 A | * 1/1992 | Yu | 371/29.1 |
| 5,577,201 A | * 11/1996 | Chan et al. | 395/185.1 |
| 5,644,707 A | * 7/1997 | Chen | 395/185.1 |
| 5,764,043 A | * 6/1998 | Czosnowski et al. | 324/66 |
| 5,788,521 A | * 8/1998 | Milan | 439/214 |
| 5,844,326 A | * 12/1998 | Proctor et al. | 307/34 |
| 5,994,998 A | * 11/1999 | Fisher et al. | 340/310.01 |
| 6,229,507 B1 | * 5/2001 | Nakamura et al. | 340/815.45 |

\* cited by examiner

Primary Examiner—Jeffery Hofsass
Assistant Examiner—Hung Nguyen
(74) Attorney, Agent, or Firm—Blakely Sokoloff Taylor & Zafman LLP

(57) ABSTRACT

A telecommunications outlet with a visual indicator that informs a user that the outlet is capable of supplying power to a network device in a network system compliant with IEEE 802.3. The outlet includes a visual indicator which activates when the outlet receives a load verification signal in accordance with IEEE 802.3. A network core device transmits the load verification signal to the outlet to determine whether there is a qualified network device connected to the outlet, and the type of the connected network device for the purpose of transmitting the appropriate power level to the network device. If the load verification signal is not present at the outlet, the outlet is not capable of supplying power to a network device. The outlet includes a visual indicator and a visual indicator driver circuit. The driver circuit generates a driving signal in response to the load verification signal. Thus, when the load verification signal is present, the driver circuit generates the driving signal which causes the visual indicator to activate, thereby visually informing users of the outlet's capability of supplying power. The load verification signal may include a train of low power and low duty cycle pulses. The driver circuit may include a charge accumulating device to form a voltage by accumulating charges each time it receives a pulse from the load verification signal, and an oscillator to generate a driving pulse when the voltage is greater than a threshold. The driving pulse causes the visual indicator to activate.

28 Claims, 3 Drawing Sheets

POWER INDICATING ETHERNET OUTLET AND METHOD THEREFOR

FIELD OF THE INVENTION

This invention relates generally to networking, and in particular, to a power indicating Ethernet outlet and method therefor.

BACKGROUND OF THE INVENTION

Local area networks (LANs) have grown tremendously in the last few years. And, leading the way in the growth of LANs is the Ethernet type LAN. Ethernet was first developed in the mid 1970s. By the early 1980s, the Institute of Electrical and Electronic Engineers (IEEE) developed a standard for Ethernet designated as IEEE 802.3, which has been universally adopted by the network industry. From the early 1980s until the present, the IEEE 802.3 standard has undergone many revisions, including the addition of new features such as switched Ethernet, Fast Ethernet, Gigabit Ethernet, and others. The present invention relates to a proposed new addition to the IEEE 802.3 standard project (P802.3af) of transmitting power over Ethernet transmission lines, as explained below.

FIG. 1 illustrates a current exemplary Ethernet network system 100 as may be employed in an office environment, home, or other establishment. The network system 100 typically comprises at least one network core device 128, such as a hub, router, bridge, repeater, etc., and at least one network device 102, such as a network telephone, clock, light switch, desktop computer, laptop computer, personal digital assistants, and other devices that can interface with a network system. The network core device 128 and the network device 102 are data coupled together via a data transmission line 120, such as those specified by IEEE 802.3 (e.g. 10BASE-T, 10BASE-F, 100BASE-TX etc.).

The network core device 128 may comprise network interfaces 130, data processing circuits 134, and memory 136 all data coupled together for performing the designated functions of the network core device. The network core device 128 may also include a power supply 132 for supplying direct current (DC) power to the each of the elements of the network core device 128, such as the network interfaces 130, the data processing circuits 134, and the memory 136. The power supply 132 may, in turn, receive alternating current (AC) power from a standard AC outlet 126 mounted on a wall 122 or, alternatively from an Uninterruptible Power Supply (UPS). The network interfaces 130 may be coupled to one or more cable transmission lines which are connected to work area telecommunications outlets 124 mounted on the wall 122 for communicating with one or more network devices, such as network device 102 by way of data transmission line 120. A specification for cabling infrastructure, cable transmission lines and work area telecommunications outlets is called out at reference ISO/IEC 11801.

The network device 102 may also comprise a network interface 108, data processing circuit 104, and memory 106 all data coupled together for performing its various functions. The network device 102 may also include a power supply 110 for supplying direct current (DC) power to the each of the elements of the network device 102, such as the network interface 108, the data processing circuit 104, and the memory 106. The power supply 110 may, in turn, receive alternating current (AC) power from a standard AC outlet 118 mounted on a wall 112, or alternatively some other sources of uninterruptible power. The network interface 108 may be coupled to a cable transmission line connected to a work area telecommunications outlet 114 mounted on the wall 112 for communicating with one or more network core devices, such as network core device 128 by way of data transmission line 120.

One drawback of the current Ethernet network system 100 is that typically each device requires its own power supply for supplying power to its various functional elements. Thus, there is a lot of redundancy in the current Ethernet network system 100. Furthermore, each network device requires two sets of cabling for operation. For instance, network device 102 has a cabling for connecting to the work area telecommunications outlet 114 and another cabling for connection to the AC outlet 118. Noting the redundancy and the cabling drawbacks of the current Ethernet network system 100, the IEEE is proposing an addition to the. IEEE 802.3 standard to allow transmission of power by way of the specified Ethernet cabling from a network core device to one or more network devices. This would eliminate the requirement of a power supply for each network device and also reduce cabling since each network device need only connect to a work area telecommunications outlet, and not additionally to an AC outlet.

FIG. 2 illustrates an exemplary Ethernet network system 200 that may incorporate the transfer of power across Ethernet cabling as being proposed by the IEEE. The network system 200 comprises at least one network core device 228 having a network interface 230, a data processing circuit 234, memory 236, and a power supply 232 coupled to an AC outlet 226 mounted on wall 222. The network interface 230, in turn, comprises a data interface and a power insertion circuit. The network interface 230 is coupled to one or more cables connected to a work area telecommunications outlet 224 mounted on wall 222. Similarly, the network device 202 comprises a network interface 208, data processing circuit 204, memory 206, and a DC-to-DC converter 210. The network interface 208, in turn, comprises a data interface and a power removal circuit. The network interface 208 of the network device 202 is coupled to a cable for connecting to work area telecommunications outlet 214 mounted on wall 212. In this case, however, the network system 200 includes a cabling 220 for communicating not only data, but also power for supplying power from the network core device 228 to one or more network devices 202.

More specifically, the power generated by the power supply 232 is sent to the power insertion circuit of the network interface 230 for transmission to the network device 202 by way of the cabling 220. The power removal circuit of the network interface 208 of the network device 202 receives this power from the telecommunications outlet 214, and sends it to the DC-to-DC converter 210 for generating the appropriate power level for each of its elements. In this way, the network device 202 need not have its own AC-powered internal power supply, but merely draws the power coming from the work area telecommunication outlet 214. It is proposed that the power may be transmitted on an unused twisted pair of wires which are available in some of the IEEE 802.3 compliant cabling, or with the addition of a phantom circuit to the two twisted pairs of wires currently in some IEEE 802.3 compliant cabling.

It is also proposed that the power on the transmission line 220 remains off when the network device 202 is not connected to the work area transmission outlet 214. Instead, the network core device 228 generates and transmits a load verification signal through the transmission line 220 when there is no qualified network device connected to the work area telecommunications outlet 214. The network core device 228 uses the load verification signal to determine whether there is a qualified network device connected to the work area telecommunications outlet 214, and possibly the type of network device connected for the purpose of transmitting the appropriate power level to the network device. It is proposed that this load verification signal is a relatively low power and low duty cycle pulsed signal. Once the network core device 228 senses a qualified network device connected to the outlet 214, it ceases transmitting the load verification signal, and transmits instead the power level required by the network device.

With this new proposed addition to the IEEE 802.3 standard, a user will need to know whether a particular work area telecommunications outlet is capable of supplying power. Such a need is met with the apparatus and method of the invention.

SUMMARY OF THE INVENTION

A telecommunications outlet is provided with a visual indicator which informs a user that the outlet is capable of supplying power to a network device. The telecommunications outlet is capable of supplying power to a network device when it receives a load verification signal received from a network core device. A network core device transmits the load verification signal to the telecommunications outlet to determine whether there is a qualified network device connected to the outlet, and possibly the type of network device connected for the purpose of transmitting the appropriate power level to the network device. When the load verification signal is not present at the telecommunications outlet, the outlet is not capable of supplying power to a network device.

The telecommunications outlet of the invention comprises a visual indicator and a visual indicator driver circuit. The driver circuit generates a driving signal in response to the load verification signal. Thus, when the load verification signal is present, the driver circuit generates the driving signal which causes the visual indicator to activate, thereby visually informing any users of the outlet's capability of supplying power.

The load verification signal may comprise a train of low power and low duty cycle pulses. To generate a driving signal in response to the pulsing load verification signal, the visual indicator driver circuit comprises a charge accumulating circuit to form a ramping voltage by accumulating charges each time it receives a pulse of the load verification signal, and an oscillator to generate a driving pulse when the pump voltage is greater than a threshold. The driving pulse causes the visual indicator to activate. The visual indicator need not "blink" at the same frequency of the pulsing load verification signal, but may blink once for every several pulses received. Accordingly, the oscillator threshold may be set to provide a visual blinking of the visual indicator which is comfortable to view.

Other aspects, features, and techniques of the invention will become apparent to those skilled in the relevant art in view of the following detail discussion of the invention.

DETAILED DESCRIPTION OF THE INVENTION

Figure 1:
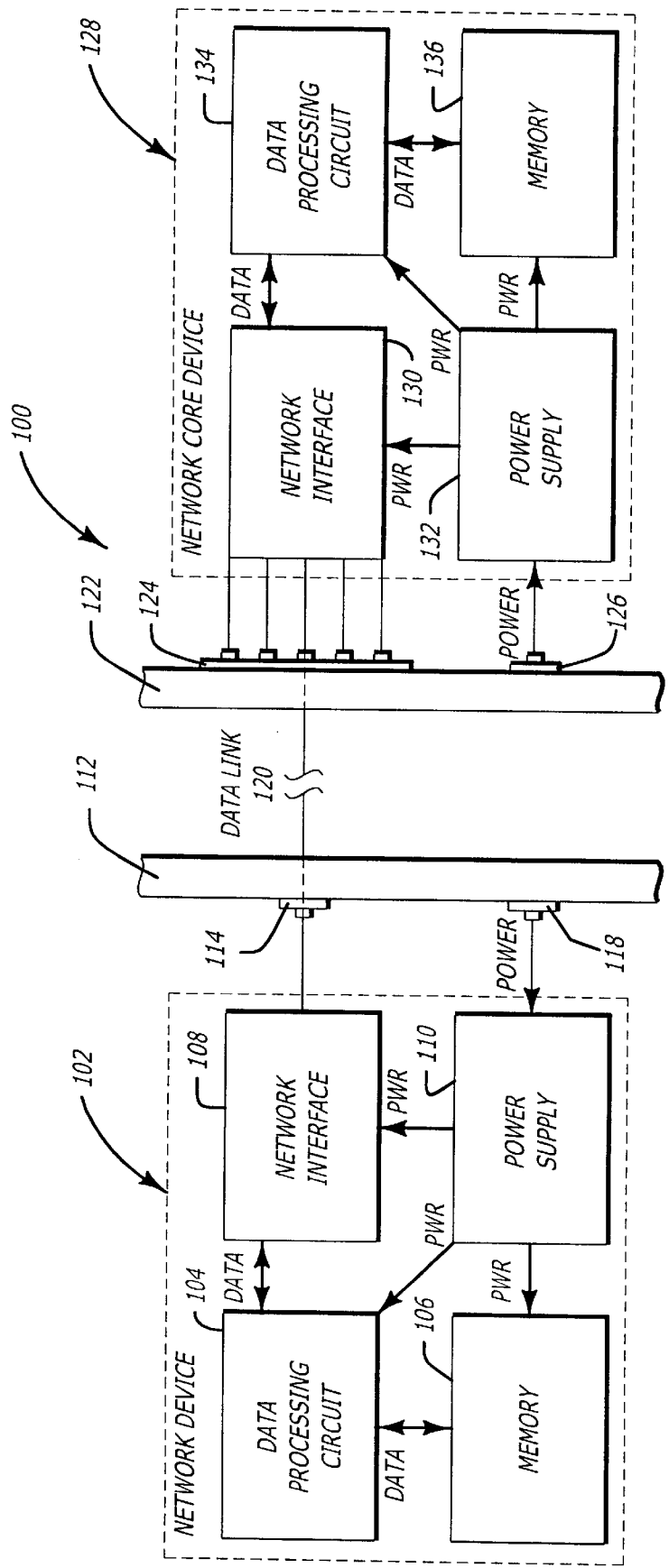
FIG. 1 illustrates a block diagram of an exemplary prior art Ethernet network system as may be employed in an office environment, home, or other establishment.
Figure 2:
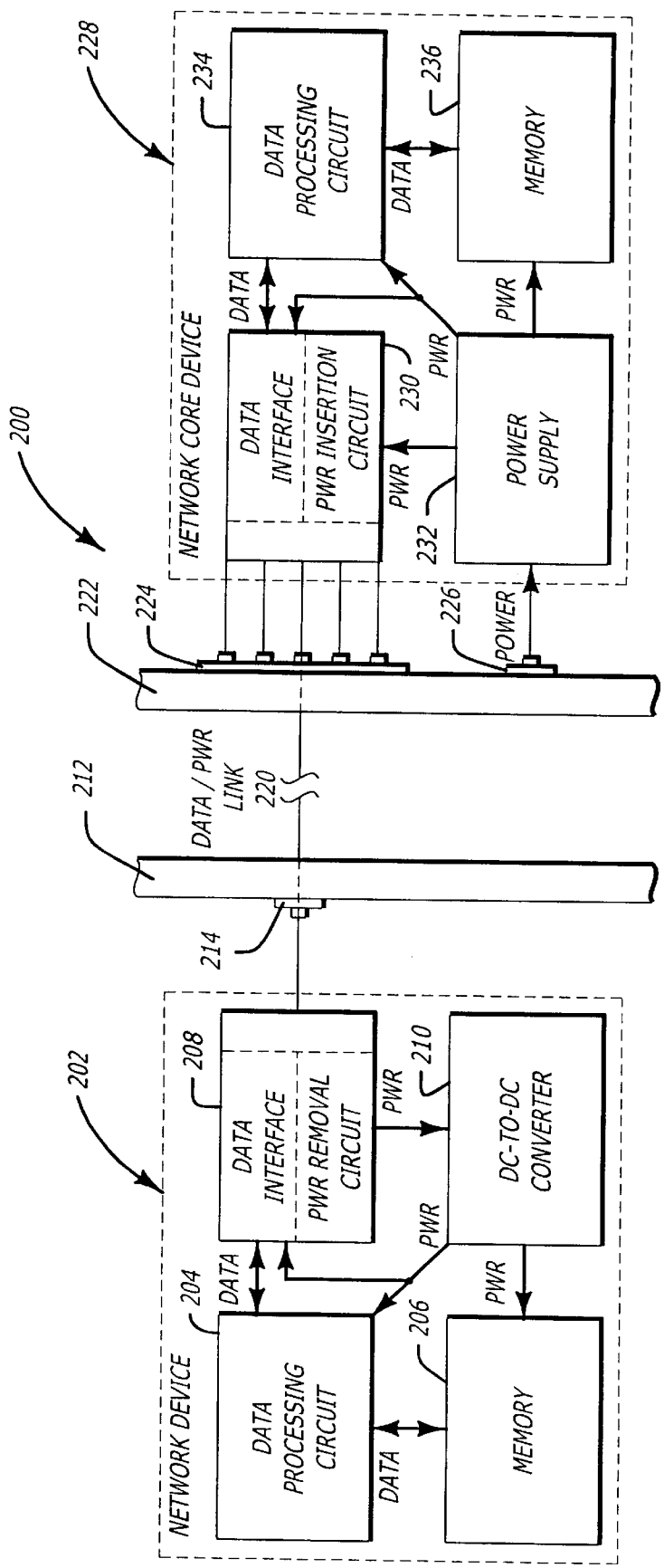
FIG. 2 illustrates a block diagram of an exemplary Ethernet network system that may incorporate the transfer of power across Ethernet cabling as being proposed by the IEEE.
Figure 3:
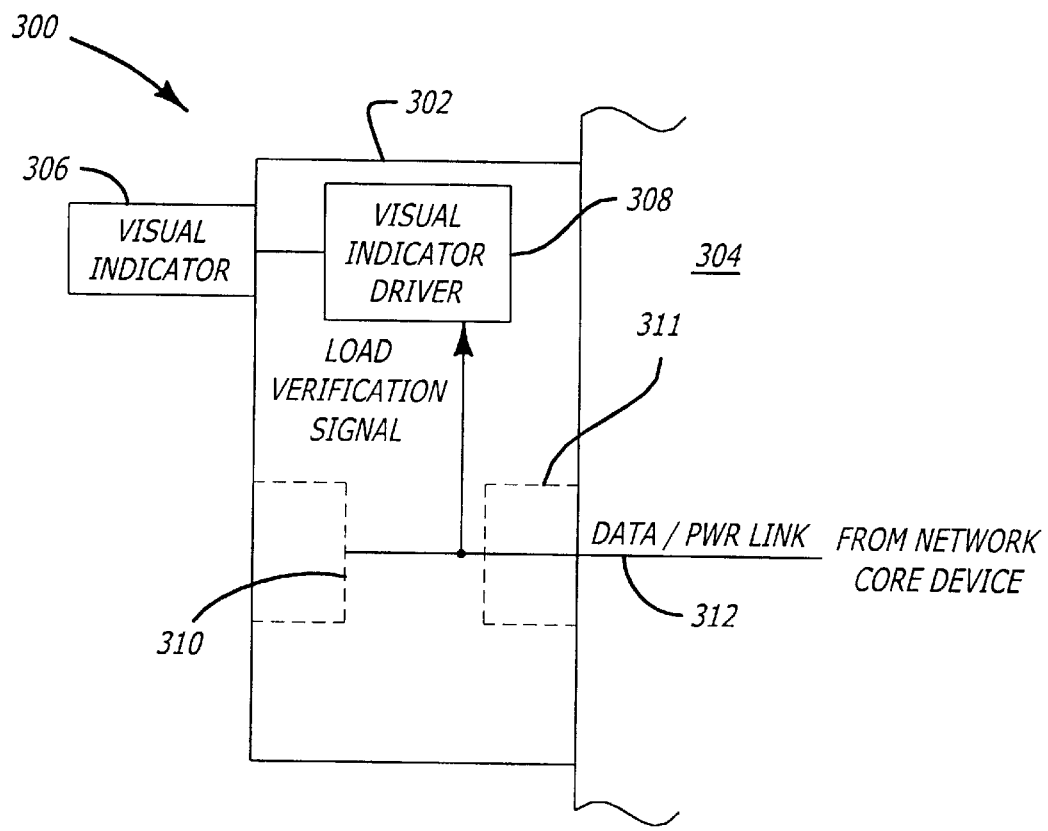
FIG. 3 illustrates a diagram of an exemplary work area telecommunications outlet in accordance with the invention.

FIG. 3 illustrates an exemplary work area telecommunications outlet 300 in accordance with the invention. The outlet 300 comprises a housing 302 having a connector 310 for connection to a network device by way of a cable. The connector 310 is electrically coupled to the data/power transmission line 312 coming from a network core device by way of connector 311. The data/power transmission line 312 carries a load verification signal which allows the corresponding network core device to determine when a qualified network device is connected to the telecommunications outlet 300, and optionally for determining the network device type for the purpose of transmitting the appropriate power level to the network device via the data/power transmission line 312 and the outlet 300.

The work area telecommunications outlet 300 further includes a visual indicator 306 mounted on the outlet housing 302, and a visual indicator driver 308. The visual indicator 306 can be a light emitting diode (LED), a liquid crystal device, an electromagnetic flag, an incandescent light, or any type of device that can produce light or change color or other visual characteristics. Within the outlet 300, the data/power transmission line 312 is tapped to provide the load verification signal to the visual indicator driver 308. Since the load verification signal is proposed to be a relatively low power signal, the visual indicator driver 308 can boost the signal power to drive the visual indicator 306. Thus, when the load verification signal is present, the visual indicator 306 activates to visually inform a user that the telecommunications outlet 300 is capable of delivering power to a network device. If the load verification signal is not present, then the visual indicator 306 will not activate, which visually tells the user that power is not currently available through the telecommunications outlet.

Figure 4:
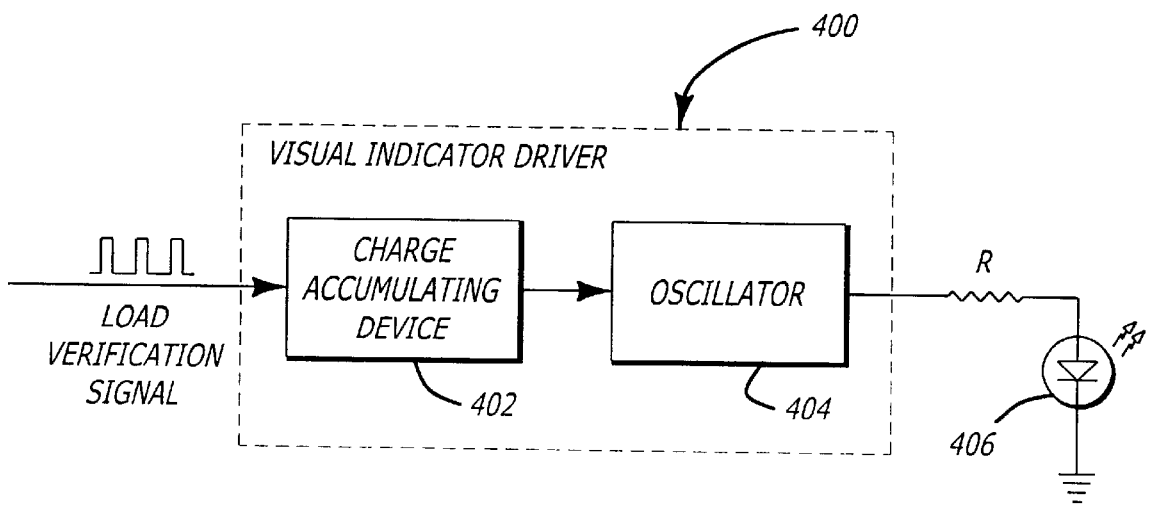
FIG. 4 illustrates a block diagram of an exemplary visual indicator driver in accordance with the invention.

FIG. 4 illustrates a block diagram of an exemplary visual indicator driver 400 in accordance with the invention. The visual driver 400 comprises a charge accumulating device 402 (e.g. a charge pump) and an oscillator 404 (e.g. a relaxation oscillator). As previously discussed, it is being proposed by the IEEE that the load verification signal is a relatively low power and duty cycle pulse signal. The frequency of the pulses are relatively high with respect to the frequency to which the visual indicator needs to blink to be comfortably viewed by a user. Accordingly, the load verification signal is applied to the charge accumulating device 402 which causes the transfer of a finite amount of charge to its output per pulse of the load verification signal. When the output of the charge accumulating device 402 reaches a pre-determined voltage level, which can take a plurality of pulses of the load verification signal to achieve, the oscillator 404 is triggered to produce a pulse of sufficient power to cause the LED 406 to blink. A resistor R may be connected in series with the LED 406 to limit the current through the device.

The advantage of the work area telecommunications outlet of the invention is that a user can easily tell when power is available at the outlet. Otherwise, the user needs to physically attach a network device to an outlet to determine whether there is in fact power available at the outlet. This can be time consuming and very frustrating. In addition, it also immediately alerts a network installer or other user when there is a problem in the network requiring servicing. Other advantages are apparent with the work area telecommunications outlet of the invention.

In the foregoing specification, the invention has been described with reference to specific embodiments thereof. It will, however, be evident that various modifications and changes may be made thereto departing from the broader spirit and scope of the invention. The specification and drawings are, accordingly, to be regarded in an illustrative rather than a restrictive sense.

What is claimed is:

1. A telecommunications outlet, comprising:
   a housing;
   a first connector to receive a first cable from a network device;
   a second connector to receive a second cable from a network core device, wherein said second cable is capable of carrying a load verification signal;
   a visual indicator; and
   a driver circuit for activating said visual indicator in response to said load verification signal.

2. The telecommunications outlet of claim 1, wherein said visual indicator comprises a light emitting diode.

3. The telecommunications outlet of claim 1, wherein said visual indicator comprises a liquid crystal device.

4. The telecommunications outlet of claim 1, wherein said visual indicator comprises an incandescent light source.

5. The telecommunications outlet of claim 1, wherein said driver circuit comprises:
   a charge accumulating device for generating a voltage by accumulating charges in response to a pulse of said load verification signal; and
   an oscillator for generating a pulse to drive said visual indicator when said voltage exceeds a threshold.

6. The telecommunications outlet of claim 1, wherein said first and second cables deliver a power signal and a data signal.

7. The telecommunications outlet of claim 6, wherein said data signal is compliant with IEEE 802.3.

8. The telecommunications outlet of claim 1, wherein said load verification signal is compliant with said IEEE 802.3 standard.

9. A method of informing a user that a telecommunications outlet is capable of delivering power to a network device, comprising activating a visual indicator associated with said telecommunications outlet in response to receiving a load verification signal.

10. The method of claim 9, wherein said load verification signal comprises a plurality of pulses.

11. The method of claim 10, further comprising:
    forming a voltage by accumulating charges each time a pulse of said load verification signal is received; and
    generating a pulse to drive said visual indicator when said voltage exceeds a threshold.

12. The method of claim 11, wherein said forming said voltage is performed by a charge accumulating device.

13. The method of claim 11, wherein said generating said pulse is performed by an oscillator.

14. The method of claim 9, wherein said visual indicator comprises a light emitting diode.

15. The method of claim 9, wherein said visual indicator comprises a liquid crystal device.

16. The method of claim 9, wherein said visual indicator comprises a incandescent light source.

17. The method of claim 9, wherein said load verification signal is compliant with IEEE 802.3 standard.

18. A telecommunications outlet, comprising:
    a first connector to receive a first cable from a network device;
    a second connector to receive a second cable from a network core device, wherein said second cable is capable of carrying a load verification signal;
    a visual indicator; and
    a driver circuit for activating said visual indicator in response to said load verification signal.

19. The telecommunications outlet of claim 18, wherein said visual indicator comprises a light emitting diode.

20. The telecommunications outlet of claim 18, wherein said visual indicator comprises a liquid crystal device.

21. The telecommunications outlet of claim 18, wherein said visual indicator comprises an incandescent light source.

22. The telecommunications outlet of claim 18, wherein said driver circuit comprises:
    a charge accumulating device for generating a voltage by accumulating charges in response to a pulse of said load verification signal; and
    an oscillator for generating a pulse to drive said visual indicator when said voltage exceeds a threshold.

23. The telecommunications outlet of claim 18, wherein said first and second cables deliver a power signal and a data signal.

24. The telecommunications outlet of claim 23, wherein said data signal is compliant with EEE 802.3.

25. The telecommunications outlet of claim 18, wherein said load verification signal is compliant with IEEE 802.3 standard.

26. The telecommunications outlet of claim 1, wherein said housing is mounted to a wall.

27. The method of claim 9, further comprising mounting said telecommunications outlet to a wall.

28. The telecommunications outlet of claim 18, further comprising a fixed member supporting said first and second connectors, said visual indicator, and said driver circuit, wherein said fixed member is mounted to a wall.

* * * * *